United States Patent

Zajaczkowski

[15] 3,666,048
[45] May 30, 1972

[54] CROSS PORTING STRUCTURE

[72] Inventor: Ernest J. Zajaczkowski, Maple Heights, Ohio

[73] Assignee: Eaton Corporation, Cleveland, Ohio

[22] Filed: Oct. 30, 1970

[21] Appl. No.: 85,522

[52] U.S. Cl. ............................................. 184/7 E, 137/269
[51] Int. Cl. ........................................................ F16n 25/02
[58] Field of Search ................ 137/269, 271; 184/7 R, 7 D, 184/7 E

[56] References Cited

UNITED STATES PATENTS

| 3,467,222 | 9/1969  | Gruber ............................. 184/7 E |
| 3,543,881 | 12/1970 | Obergefell ....................... 184/7 D |
| 3,371,745 | 3/1968  | Callahan et al ................. 184/7 E |
| 3,438,463 | 4/1969  | Gruber ............................. 184/7 E |
| 2,973,058 | 2/1961  | Bricout ............................ 184/7 E |

*Primary Examiner*—Manuel A. Antonakas
*Attorney*—Teagno & Toddy

[57] ABSTRACT

A cross porting structure for lubricant feeders. The structure includes a continuous straight outlet passageway having an outlet opening at opposite ends of said feeder and a pair of supply passageways alternately supplying lubricant to the outlet passageways, each supply passageway including an axial extension thereof acting as an alternate outlet opening and having a spring biased check valve located therein. Interposed between the intersection of the two supply passageways and the outlet passageway is a plug type valve which in one position serves to connect a supply passageway with one set of outlet openings and in a second position serves to connect each of the supply passageways with both sets of outlet openings.

4 Claims, 6 Drawing Figures

INVENTOR
ERNEST J. ZAJACZKOWSKI

ATTORNEYS

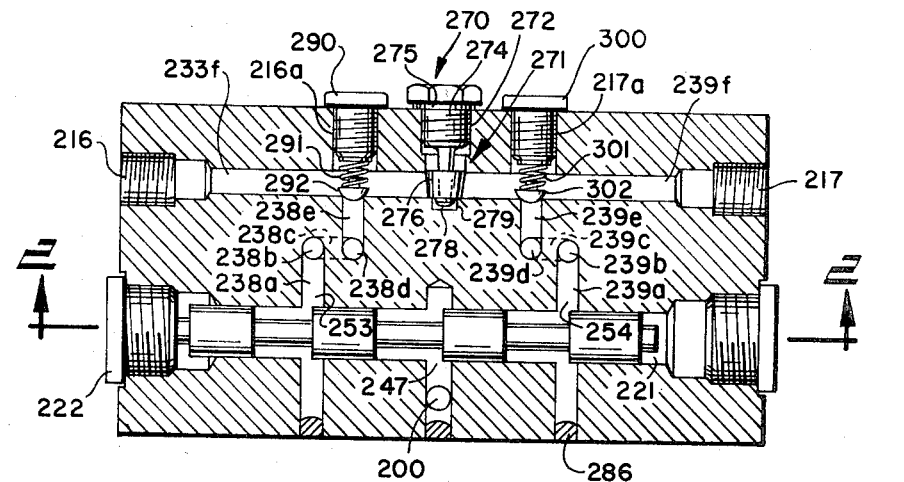
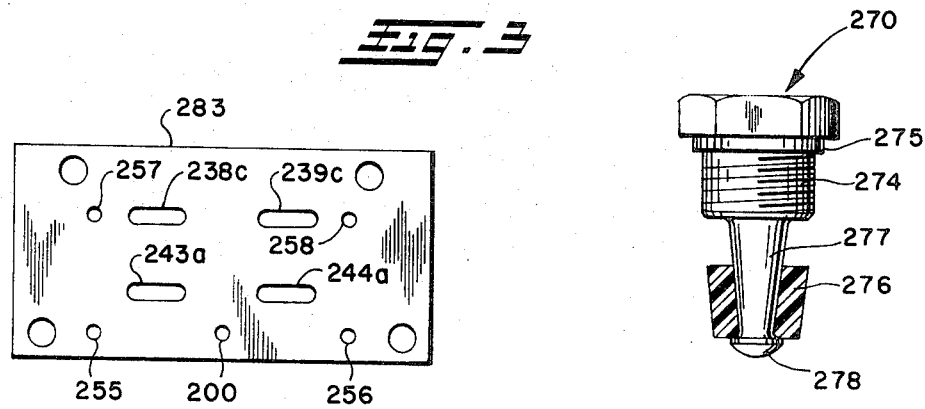
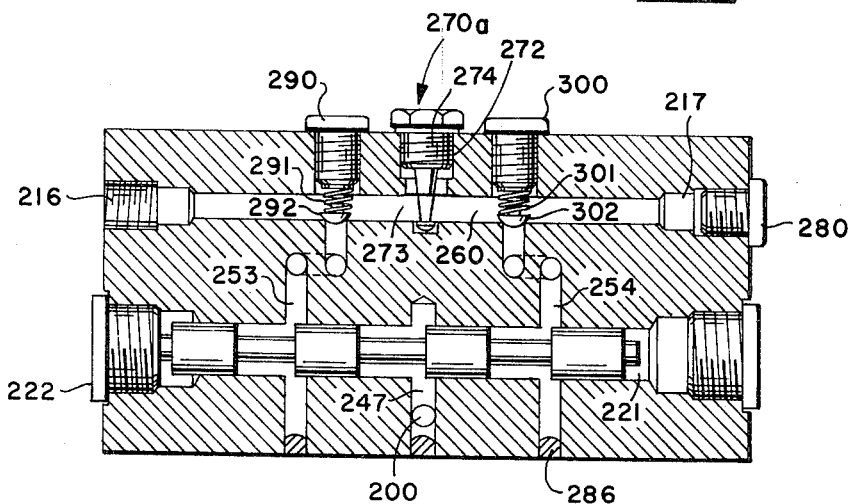
INVENTOR
ERNEST J. ZAJACZKOWSKI
ATTORNEYS 3,666,048

CROSS PORTING STRUCTURE

BACKGROUND OF THE INVENTION

This invention relates to lubricating systems and concerns particularly a divisional feeder in which lubricant is transmitted from a central station to a plurality of lubricated devices distant therefrom such as bearings.

The invention relates to divisional lubricant feeders of the general type illustrated in Gruber U.S. Pat. No. 3,467,222 and also applies to lubricant feeders having different types of valve bodies. In the course of operation of such feeders, lubricant is alternately ejected from each of both ends of a cylinder as a piston moves back and forth. For each cylinder end chamber there is a lubricant outlet opening controlled through suitable porting in an adjacent cylinder and piston unit.

An object of this invention is to provide an improved lubricant distributor.

A further object of this invention is to provide an improved cross porting structure for a lubricant divisional feeder.

A further object of this invention to provide improved arrangements for permitting the lubricant ejected from each end chamber of a cylinder to be expelled through the same outlet opening depending on which one of two simple fittings is mounted in the feeder block.

Other and further objects, features and advantages of the invention will be apparent as the description proceeds.

BRIEF SUMMARY OF INVENTION

In carrying out the invention in accordance with the preferred form thereof a valve block of the type illustrated in the aforesaid Gruber patent or a generally similar valve block is cross drilled to provide an interconnection between outlet passageways of the two outlet openings in each valve block. Means are provided so that one or the other of the outlet openings may be plugged when desired and a set of two fittings is provided for selectively closing the cross drilled interconnecting passageway when it is desired to use both outlet openings or for leaving the interconnection open when it is desired to use only one of the outlet openings while plugging the other. The supply passageways intersect the outlet passageway on either side of the interconnecting means. The supply passageways axially extend to the end of the feeder block and provide an alternate opening therein. Located within the axial extension of said supply passageways is a spring biased check valve. The interconnecting means is a generally conically shaped chamber which may be plugged by a conically shaped resilient member.

A better understanding of the invention will be afforded by following detailed description considered in conjunction with the accompanying drawing, in which:

BRIEF DESCRIPTION OF THE DRAWINGS

FIG. 3 is a view of a section of one of the valve blocks represented as cut by a plane 3 — 3 through the center line of the piston bore and perpendicular to the section plane of FIG. 2;

FIG. 4 is a plane view of a spacer employed in conjunction with the valve block assembly of FIGS. 1 and 2;

FIG. 5 is similar to FIG. 3 with a modified plug arrangement.

FIG. 6 is a section view of one plug means.

DETAILED DESCRIPTION OF THE INVENTION

Figure 1:
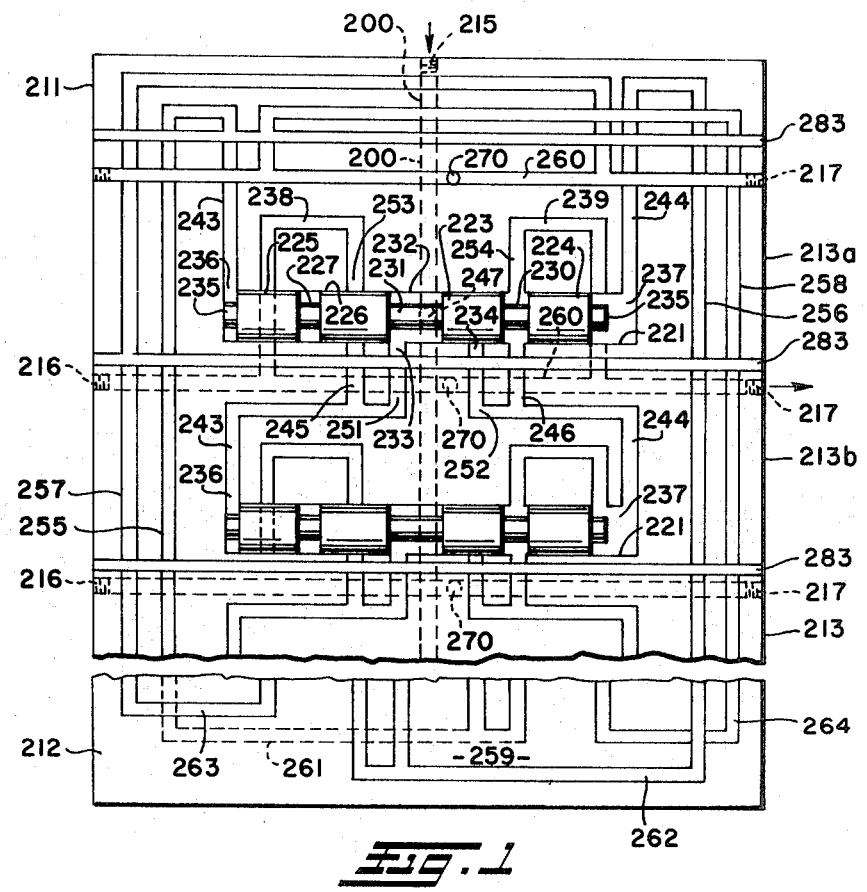
FIG. 1 is a schematic diagram and flow diagram of an embodiment of the invention with a portion of the apparatus broken away to avoid unnecessary duplication of similar components.

The flow of lubricant and the action of the pistons in covering and uncovering ports is shown in the schematic diagram of FIG. 1.

In carrying out the invention into practical form with separate valve blocks and separate end blocks, an inlet block 211 and an end block 212 are provided with a plurality of valve blocks 213 clamped between the end blocks 211 and 212 by suitable means such as bolts (not shown). The inlet block 211 has, as shown, a threaded inlet opening 215 for connection to a source of fluid lubricant under pressure. Outlets 216 and 217 are also provided in each valve block.

Connected to the inlet opening 215 and the inlet block 211 is an inlet passageway 200 which continues through each of the valve blocks and terminates at the end block 212.

Each valve block 213 is drilled lengthwise to form a bore or hollow cylinder 221 (FIGS. 2 and 3) the ends of which are closed by threaded plugs 222. Each cylinder 221 contains piston means shown as being of the four-landed type. The lands 225 and 226 are separated by a neck portion 227 and the lands 223 and 224 are separated by a neck portion 230. There is also a center stem 231 separating lands 223 and 226 so as to leave a central chamber 232 open in the cylinder 221 between transfer ports 233 and 234. The central chamber 232 also has an inlet port 247. As shown, the piston is provided with end stems 235 extending outwardly into end chambers 236 and 237 in the cylinder 221.

Exit paths 238 and 239 are formed in each block extending from outlet ports 253 and 254 to the outlet openings 216 and 217, respectively. Each exit path may, if desired, be formed in part in one block and in part in an adjacent block for convenience in manufacturing and to enable a discharge from an end chamber in a block to issue from an outlet in the same block.

For each cylinder there is also a pair of transfer passageways 243 and 244. Each transfer passageway 243 or 244 is connected at one end to an end cylinder chamber 236 or 237 and is branched at the other end. Outer branches 245 and 246 are opposite outlet ports 253 and 254. Inner branches 251 and 252 are at the central chamber area 232 so that one or the other of the branches 251 or 252 can communicate with the inlet port 247 according to the longitudinal position of the piston.

As already explained, the blocks are drilled with suitable transverse openings so that the inlet passageway 200 extends through all of the valve blocks of the feeder. In order that the operation may be cyclical with the first valve operating again after the last has operated, additional transverse holes are drilled in the valve blocks to provide return passageways from the upper block to the lower and vice versa. One set of such drilled holes provides interconnecting passageways 255 and 256 for completing the transfer passageways corresponding to passageways 243 and 244 between the uppermost cylinder and the lowermost cylinder and vice versa. Likewise, another set of drilled holes is for forming interconnecting passageways 257 and 258 for completing the exit path corresponding to the paths 238 and 239 between the lowermost block and the uppermost block.

The end block 212 is formed with suitable interconnecting passageways including transfer or crossover passageways 261 and 262 connected to interconnecting passageways 255 and 256, respectively, and portions of outlet passageways 263 and 264 connected to interconnecting passageways 257 and 258, respectively. However, in order that reverse movement of the pistons in the upper block will commence after movement in the initial direction of all of the blocks has been completed, a crossover 259 of passageways 261 and 262 is provided so that the passageway 261 is connected to ports of the lowermost cylinder on the right hand side instead of the left and likewise the passageway 262 is connected to ports on the left hand side instead of the right.

As explained, the exit paths 238 and 239 are connected to outlet openings 216 and 217, respectively, so as to connect outlet ports 253 and 254 to the outlet openings 216 and 217, respectively. However, in some cases it is desired to provide a double supply of lubricant for some bearings and to cause all of the lubricant flow controlled by one valve to issue from a single outlet opening instead of to issue alternatively from the two outlet openings. To accomplish this an interconnecting passageway 260 is provided between the outlet openings 216 and 217; and a fitting 270 indicated schematically in FIG. 1 is provide for enabling the interconnecting passageway 260 to be opened or closed selectively according to whether it is desired to expel all of the lubricant from only one of the outlet openings 216 and 217 under control of either of the outlet ports 253 and 254 or to close the interconnection when it is desired to discharge separately to the outlet openings 216 and 217. Although the invention is not limited thereto, as will be explained in greater detail hereinafter, the interconnection between the outlet openings 216 and 217 may be accomplished by cross drilling. It will be observed that the fitting 270 for opening or closing the interconnection 260 is located in the interconnecting passageway 260 between the points at which the outlet passageways 238 and 239 are connected to the outlet openings 216 and 217.

Figure 2:
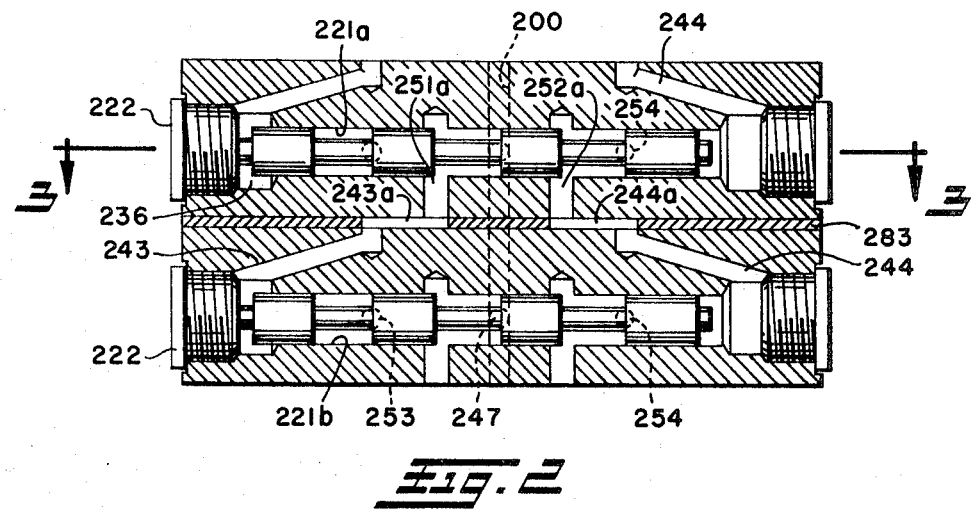
FIG. 2 is a view of a section of two of the connected valve blocks of FIG. 1 represented as cut by a plane 2 — 2 indicated in FIG. 3 taken through the center lines of the piston bores of the valve blocks.

In order to simplify the schematic flow diagram and enable the passageways to be shown in a single plane, the actual location of passageways in the blocks has been modified to some extent in the schematic showing of FIG. 1. The actual location in illustrative blocks is shown in FIGS. 2 and 3. FIG. 1 serves, however, to illustrate the principle of operation.

By way of example, the action of the upper valve block 213, designated by the suffix a, in controlling the movement of the piston in the adjacent or second valve block 213b will first be considered. When lubricant under pressure is applied to the inlet 215, it fills the inlet passageway 200 and issues from the inlet port 247 into the central chamber 232. The fluid pressure is directed through passages 251 and 243 to the left hand end chamber 236 of the cylinder 221 in the block 213b causing that piston to move to the right.

When the piston in the valve block 213b moves to the right, it expels lubricant from the right hand end chamber through the transfer passageway 244 and the branch passageway 246 across an intermediate chamber around the piston neck 230 and out through the outlet port 254 and the exit path 239 through the outlet opening 217. The lubricant paths are shown stippled. It is assumed that the fitting 270 has been placed in such a way as to close the interconnection 260. However, if it is desired to have the lubricant issue instead from the outlet opening 216 and join that discharged when the piston in the block 213b moves to the left, this is accomplished by plugging the outlet opening 217 and opening the interconnecting passageway 260 by using fitting 270a (FIG. 5).

When the piston in the block 213b has been moved to the right, it opens appropriate ports for causing the piston in the next valve block to move in the opposite direction and thus continuous cycling operation takes place in the manner described more fully in the aforesaid Gruber patent.

When the valve blocks 213 are assembled with inlet block 211 and the end block 212, spacers 283 such as illustrated in FIG. 4 are interposed. It will be understood that the thickness of the spacers is distorted in FIG. 1. The fluid circuit paths in the actual valve blocks take place in part through slots in the spacers 283.

Thus, the transfer passageways corresponding to the transfer passageway 243 shown in FIG. 1 are provided in the actual valve blocks as follows:

Referring first to FIG. 2, from the left hand end chamber 236, of the cylinder 221b fluid passes through obliquely drilled transfer passageway opening 243 and a drilled hole in the face of the block, perpendicular to the face, forming a continuation of the passageway 243, a slot 243a in the spacer 283 of FIG. 6 along the faces of the blocks abutting the spacer 283 and into port 251a at the end of the passageway branches 245 and 251 (FIG. 1) shown in FIG. 2 at the slot 243a. Corresponding openings in the blocks and the spacer provide the passageway 244 of FIGS. 1 and 2. The port 233 for the branch 241, as previously explained, is at the central chamber 232 of the cylinder 221 to cooperate with the inlet port 247 and the inlet passageway 200.

The manner in which the lubricant exits the divisional feeder is shown in FIG. 3. The right hand exit path 239 is formed by a drilled opening 239a intersecting opening 239b at a slot 239c in the spacer 283 (see (FIG. 4). The exit path further includes a drilled hole 239d in the block parallel to the opening 239b and a drilled hole 239e which intersects the interconnecting passageway 260. A portion 239f of interconnecting passageway 260 continues to the right and constitutes the remainder of the exit path 239 which ends at outlet opening 217. Corresponding parts of the left hand exit path 238 are represented by the suffixes a to f inclusive. For purposes of simplicity the term outlet passageway will mean that passageway formed by left hand outlet opening 216, portion 238f of the left hand exit path, interconnecting passageway 260, portion 239f of the right hand exit path and right hand outlet opening 217.

It will be understood that to form the passageways by means of drilled holes it is necessary to drill into the interior of the block from the outer surface. Accordingly, the holes which are not intended to be open at the exterior surface of the block are closed in a suitable manner such as by means of steel balls welded in place as illustrated by the welded balls 286. It is understood, however, that other suitable plugging means may be used.

The fittings 270 and 270a (FIGS. 3 and 5 respectively) for selectively causing all of the lubricant to discharge from one of the outlet openings 216 or 217 or for causing the discharge to issue alternately from each of said openings are fitted into a chamber 271 which comprises a threaded section 272 and a conical sealing chamber 273 intersecting the interconnecting passageway 260.

Both plugs 270 and 270a have a threaded upper section 274 with a sealing member 275 therein. The plug 270 additionally has a conical member 276 made of a resilient material for engaging conical sealing chamber 273 and sealing the interconnecting passageway 260.

Conical member 276 is rotatably mounted on stem 277 of plug 270, see FIG. 6. It should be noted stem 277 has an enlarged portion 278 thereon to assure proper removal of member 276 when plug 270 is removed from the valve assembly.

When it is desired to alternately discharge lubricant from outlet openings 216 and 217, plug 270 is used and the interconnecting passageway 260 is plugged at conical sealing chamber 273 as seen in FIG. 3. When it is desired to plug one of these outlet openings as by a plug 280 (FIG. 5) and have all of the lubricant discharged from the other outlet opening the conical member 276 of plug 270 is removed or lifted and plug 270a is used to close chamber 271. For sealing purposes a sealing member 275 is provided around the threads of the plug. Sealing member 275 may consist of a plastic insert or other similar material. One type of plastic material which is suitable as a sealing member is sold under the Trademark NYLOK.

Axially extended from supply passageways 238e and 239e are alternate outlet openings 216a and 217a respectively. In the embodiment shown the alternate outlet openings are closed by plugs 290 and 300 which are identical to plug 280. Held in place by plugs 290 and 300 are springs 291 and 301 which bias check valves 292 and 302 respectively into a closed position.

It will be apparent that when the plug 270 is in the position shown in FIG. 3 the interconnecting passageway 260 is closed. The outlet port 253 can control discharge only through the outlet opening 216 from the adjacent valve block cylinder when the piston in the adjacent valve block is moved to the left; and the outlet port 254 can control discharge only through the outlet opening 217 from the adjacent valve block cylinder when the piston therein is moved to the right. However, when the plug 270 is replaced by plug 270a as shown in FIG. 5 the interconnecting passageway 260 is open. As described above one of the outlet openings 216 or 217 is closed such as by plug 280, and the lubricant from each end of the cylinder in the adjacent valve block discharged from the same outlet opening.

As shown by the drawings, no internal drilling is required in order to obtain the alternative connections for single or double outlet from each cylinder. Also, no unsightly external connections are required for this purpose and the valve can be converted from single outlet to double outlet very readily if desired. Moreover, as plugs 270 and 270a may carry different markings, there is an obvious indication of which valves are being operated as cross ported and no confusing numbers or markings are required on the valve.

As shown in FIG. 3, if desired, additional outlet openings 216a and 217a, shown closed by plugs 290 and 300 may be provided on the side surfaces instead of the end surfaces where this may be more convenient in assembly with a lubrication system. It will be understood that when the side outlets 216a and 217a are employed, the end outlets 216 and 217 will be plugged and vice versa.

The invention has thus far been described as employing specifically in connection with a single line, or series, progressive lubricant feeder system of the type described in the aforesaid Gruber patent, with a single inlet port 247 in the central chamber of each cylinder 221. However, the invention is not limited thereto and may be carried out also in connection with divisional lubricant feeders of a type in which there are two inlet ports.

Certain embodiments of the invention and certain methods of operation embraced therein have been shown and particularly described for the purpose of explaining the principle of operation of the invention and showing its application, but it will be obvious to those skilled in the art that many modifications and variations are possible and it is intended therefore, to cover all such modifications and variations as fall within the scope of the invention.

What is claimed is:

1. A lubricant feeder block comprising:
   a single straight outlet passageway having openings at opposite sides of said block;
   a first and second supply passageway intersecting said outlet passageway, said supply passageway axially extending to an opening at a side of said block substantially perpendicular to the first mentioned opposite sides of said block and providing alternate outlet openings thereat, said first and second supply passageways further containing check valves between the intersection of said supply and outlet passageways and said alternate outlet openings thereat, said first and second supply passageways further containing check valves between the intersection of said supply and outlet passageways and said alternate outlet openings;
   valving means within said block for supplying lubricant to said first and second supply passageways alternately; and
   means intersecting said outlet passageway at a point between the intersections of said outlet passageway and said first and second supply passageways for alternatively blocking or opening the outlet passageway between the said intersections, said means for alternatively blocking or opening the passageway between the two intersections including a conical sealing chamber and at least two plugs cooperable with said conical chamber, said first plug having a conical resilient nose portion for engaging said conical sealing surface and blocking the outlet passageway between the two said intersections, and the second plug not engaging the conical sealing surface thereby allowing the two intersections to be in lubricant communication.

2. The lubricant feeder of claim 1 wherein said resilient nose portion is plastic.

3. The lubricant feeder of claim 2 wherein said at least two plugs carry distinguishing exterior markings.

4. A substantially rectangular lubricant feeder block comprising:
   a single straight outlet passageway having outlet openings at opposite sides of said block;
   first and second supply passageways perpendicularly intersecting said outlet passageway, said supply passageways axially extending to and opening at a side of said block substantially perpendicular to the first mentioned opposite sides of said block and providing alternate outlet openings thereat, said first and second supply passageways further containing spring biased check valves between the intersection of said supply passageways and said alternate outlet openings;
   valving means within said block for supplying lubricant to said first and second supply passageways alternately;
   means including a conical sealing chamber intersecting said outlet passageway at a point between the intersections of said outlet passageway and said supply passageways for alternately opening or closing the passageway between said intersections; and
   at least two plugs carrying distinguishing external markings cooperable with said conical sealing chamber, the first said plug having a resilient conical nose portion for engaging said conical sealing chamber and sealing said passage between the two intersections and the second plug not engaging said sealing surface thereby allowing the two intersections to be in lubricant communication.

* * * * *